United States Patent
Kämmerer et al.

(10) Patent No.: US 9,689,427 B2
(45) Date of Patent: Jun. 27, 2017

(54) TILTING PAD AND RADIAL PLAIN BEARING

(71) Applicant: Voith Patent GmbH, Heidenheim (DE)

(72) Inventors: Steffen Kämmerer, Immenstadt (DE); Ralph Rudolph, Rettenberg (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 14/890,522

(22) PCT Filed: May 13, 2014

(86) PCT No.: PCT/EP2014/059715
§ 371 (c)(1),
(2) Date: Nov. 11, 2015

(87) PCT Pub. No.: WO2014/184170
PCT Pub. Date: Nov. 20, 2014

(65) Prior Publication Data
US 2016/0115996 A1  Apr. 28, 2016

(30) Foreign Application Priority Data

May 17, 2013  (DE) .................. 10 2013 209 199

(51) Int. Cl.
*F16C 33/10*  (2006.01)
*F16C 17/03*  (2006.01)
(Continued)

(52) U.S. Cl.
CPC ............ *F16C 33/108* (2013.01); *F16C 17/03* (2013.01); *F16C 33/1045* (2013.01); *F16C 33/1065* (2013.01); *F16C 37/002* (2013.01)

(58) Field of Classification Search
CPC .... F16C 17/03; F16C 33/108; F16C 33/1045; F16C 33/1085; F16C 37/002;
(Continued)

(56) References Cited

U.S. PATENT DOCUMENTS 2,315,674 A    4/1943  Tichvinsky et al.
3,512,854 A *  5/1970  Harbage, Jr. ........... F16C 17/06
                                                  384/308
(Continued)

FOREIGN PATENT DOCUMENTS

CH    352197     2/1961
JP    58-102819 A  6/1983
(Continued)

OTHER PUBLICATIONS

Communication Regarding the Transmission of the International Search Report and the Written Opinion of the International Searching Authority or Declaration dated Oct. 21, 2014 for International Application No. PCT/EP2014/059715 (17 pages).
(Continued)

*Primary Examiner* — Marcus Charles
(74) *Attorney, Agent, or Firm* — Taylor IP, P.C.

(57) ABSTRACT

A tilting pad, preferably for a radial plain bearing which supports a shaft, with a spaced position in relation to a bearing axis and comprising a supporting surface and a bearing surface opposite the supporting surface, whereby the supporting surface is delimited in an axial direction by two lateral surfaces when viewed transversely, and in a circumferential direction by a run-in edge and a run-out edge when viewed in an installation position, and whereby structures aiding removal of lubricant and coolant are provided on the run-out edge; wherein the structures aiding removal of lubricant and coolant on the run-out edge comprise open-edged recesses arranged on the run-out edge spaced apart from one another in an axial direction.

19 Claims, 2 Drawing Sheets

(51) Int. Cl.
*F16C 23/02* (2006.01)
*F16C 37/00* (2006.01)

(58) Field of Classification Search
CPC ............... F16C 33/1065; F16F 37/002; Y10T 29/49696; Y10T 29/49643
USPC .......... 384/99, 114, 117, 308–309, 311–313, 384/317, 321–322
See application file for complete search history.

(56) References Cited

U.S. PATENT DOCUMENTS

| | | | |
|---|---|---|---|
| 3,549,215 A * | 12/1970 | Hollingsworth | F16C 17/03 384/117 |
| 3,823,991 A | 7/1974 | Lamperski | |
| 3,891,283 A | 6/1975 | Pruvot | |
| 4,497,587 A * | 2/1985 | Pine | F16C 17/03 384/117 |
| 5,007,745 A * | 4/1991 | Ball | F16C 17/06 384/307 |
| 5,288,153 A * | 2/1994 | Gardner | F16C 17/03 384/117 |
| 5,482,380 A * | 1/1996 | Corratti | F16C 17/03 384/309 |
| 5,513,917 A | 5/1996 | Ide et al. | |
| 5,518,321 A | 5/1996 | Hata | |
| 5,702,186 A | 12/1997 | Hackstie et al. | |
| 5,743,657 A | 4/1998 | O'Reilly et al. | |
| 6,200,034 B1 * | 3/2001 | Miller | F16C 17/03 384/117 |
| 6,485,182 B2 * | 11/2002 | Nicholas | F16C 17/03 384/117 |
| 6,623,164 B1 | 9/2003 | Gozdawa | |
| 7,165,889 B2 * | 1/2007 | Light | F16C 32/0659 384/115 |
| 8,734,019 B2 * | 5/2014 | Palomba | F16C 43/02 384/117 |

FOREIGN PATENT DOCUMENTS

| | | | | |
|---|---|---|---|---|
| JP | 58-180815 A | | 10/1983 | |
| JP | 9-144750 A | | 6/1997 | |
| JP | 2001-200847 A | | 7/2001 | |
| JP | 2004-156690 A | | 6/2004 | |
| JP | 2009-30704 A | | 2/2009 | |
| JP | 2010-216318 A | | 9/2010 | |
| JP | EP 3032123 A1 * | 6/2016 | ............... F16C 17/03 |
| KR | 100697852 B1 * | 3/2007 | ............... F16C 17/10 |
| SU | 983361 A * | 12/1982 | ............... F16H 57/04 |
| WO | WO 2013055454 A1 * | 4/2013 | ............ F01D 25/166 |

OTHER PUBLICATIONS

German Office Action dated Apr. 8, 2014 for German Application No. 10 2013 220 981.9 (10 pages).
German Office Action dated Apr. 7, 2016 for German Application No. 10 2013 209 199.0 (10 pages).

\* cited by examiner

FIG. 1
FIG. 2
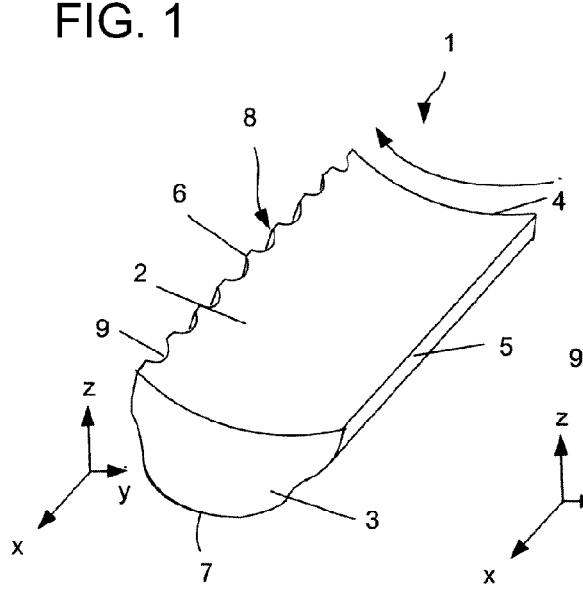
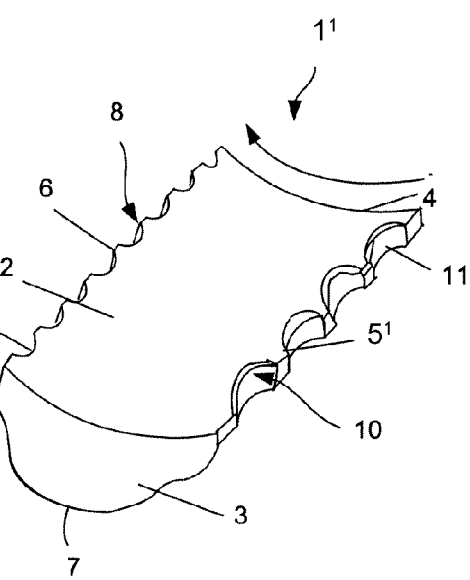
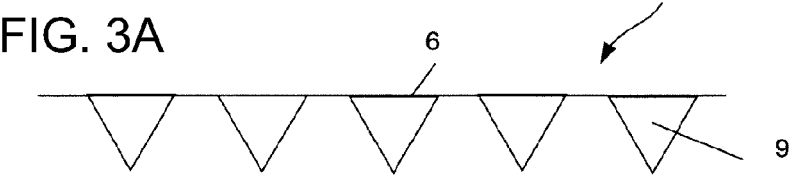
FIG. 3A
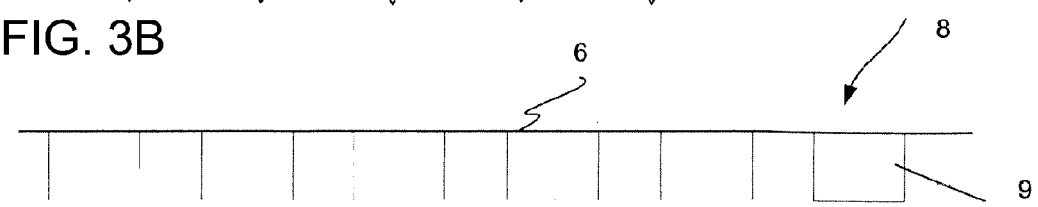
FIG. 3B
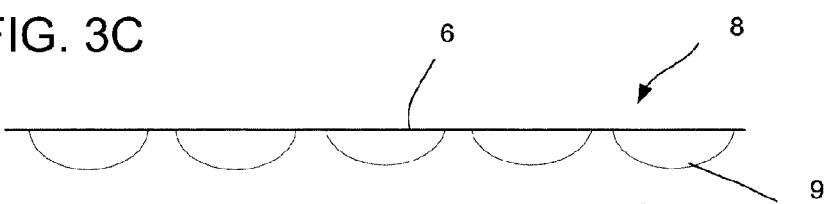
FIG. 3C
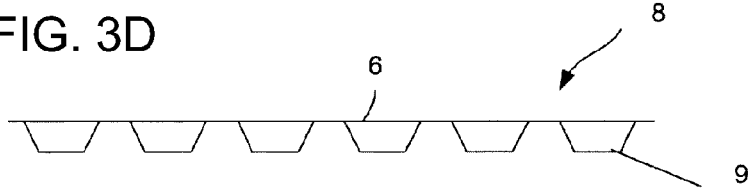
FIG. 3D

TILTING PAD AND RADIAL PLAIN BEARING

CROSS REFERENCE TO RELATED APPLICATIONS

This is a continuation of a PCT application No. PCT/EP2014/059715, entitled "TILTING PAD AND RADIAL PLAIN BEARING", filed May 13, 2014, which is incorporated herein by reference.

BACKGROUND OF THE INVENTION

1. Field of the Invention

The invention relates to a tilting pad, preferably for a radial plain bearing having such a tilting pad.

2. Description of the Related Art

Radial plain bearings with tilting pads are known in different designs from the current state of the art. These require a lubricant and coolant supply system that supplies the required amount of lubricant for realization of the plain bearing function. The lubricant and coolant is introduced into a region between a tilting pad and the interior circumference of the bearing housing and is drawn via the shaft into the nip between said shaft and the supporting surface. A substantial problem with all plain bearings however, is the heat that is generated due to the hydrodynamic sliding effect. In order to remove said heat, the lubricant used for the hydrodynamic sliding effect in high efficiency plain bearings is again discharged if possible after coating the supporting surface of the respective tilting pad, so as not to introduce the heat that was absorbed by it, into the next tilting pad in circumferential direction. Wiping devices which are located after the run-out edge are used for the removal. In addition to additional space, the positioning of the wiping devices however, requires provision of additional components in the bearing.

SUMMARY OF THE INVENTION

The present invention provides a radial plain bearing of the type mentioned in the beginning so that a simple and reliable removal of lubricants after coating of the supporting surface of a tilting pad can be achieved; and the introduction of hot drag oil into the next nip in circumferential direction between the shaft and a supporting surface is reliably prevented. The inventive solution is to be constructively simple and cost effective.

A tilting pad according to the invention, for spaced positioning in relation to a bearing axis for supporting shafts in plain bearings, having a supporting surface and a bearing surface arranged opposite said supporting surface, whereby the supporting surface is delimited in axial direction by two lateral surfaces and viewed transversely thereto (transverse direction), in particular when viewed in installation position in circumferential direction by a run-in edge and a run-out edge, and is characterized in that structures aiding the removal of lubricant and/or coolant are provided on the run-out edge.

"Structures" are understood to be features that are designed and arranged such as to produce a contour of the run-out edge that deviate from straight. In an especially advantageous arrangement these are designed integral with the tilting pad and either incorporated during construction or are produced subsequently through machining In an alternative arrangement such structures can be added as separate elements to the run-out edge or arranged on same.

The solution according to the invention reduces slopping over of hot lubricant—as is present at the run-out edge between shaft and pad in rotational direction of the shaft—in the direction of the run-in edge of the tilting pad located following the shaft in rotational direction and dragging into the nip that is formed between said tilting element and the shaft.

In one embodiment additional structures are provided on the run-in edge that influence the guidance of lubricant and coolant. These permit a targeted distribution and flow to the supporting surface over its extension in the longitudinal direction and thereby a targeted adjustment of the lubrication film between shaft and tilting element.

The effect of the individual structures in regard to lubricant and coolant guidance-affecting or lubricant and coolant removal at the respective edge—run-in edge or run-out edge—is adjustable as a function of at least one of the following factors or of a combination thereof:

- number of structures in axial or longitudinal direction of the tilting pad
- geometry or respectively contour of the individual structure
- sizing of the individual structure
- layout and alignment of the structures relative to one another in axial or respectively longitudinal direction of the tilting pad As a result of the targeted design of the respective edges, the lubricant and coolant supply or removal can be specifically adjusted over the entire supporting surface.

In another embodiment, the individual structures at the run-in edge and/or run-out edge include in each case open-edged recesses respectively on the run-in and/or run-out edge which are arranged spaced apart from one another in axial direction. Since they are designed directly on the tilting pad they are especially space-saving. Viewed in installation location, the open-edged recesses extend in a circumferential direction.

In regard to the positioning and design of the open-edged recesses, there are a multitude of possibilities. According to a first embodiment the individual open-edged recesses that are arranged always on one of the edges—run-in edge and/or run-out edge-are designed identically according to at least one or according to a combination of the following factors:
- geometry
- sizing
- distance between adjacent recesses According to a second embodiment the individual open-edged recesses that are arranged on at least one of the edges—run-in edge and/or run-out edge-are designed differently in regard to at least one, or a combination of the following factors:
- geometry
- sizing
- distance between adjacent recesses The first embodiment offers the advantage of an especially simple manufacturability. The second embodiment allows for a more targeted adjustability of the lubricant and/or coolant removal.

The individual open-edged recess has either a constant cross sectional geometry over an extension perpendicular to the longitudinal direction, in particular in vertical direction, or is characterized by a cross sectional change. An improved suction effect that leads to an improved removal of drag oil at the run-out edge can be achieved by the latter.

The cross sectional geometry from the edge into the pad is preferably characterized by a cross sectional change. A design with a constant cross section is also conceivable.

There are no limitations in regard to the geometry of the open-edged recesses. The geometry of the individual open-edged recess can preferably be described by an element from the group below, or a combination thereof:
  circle
  ellipse
  polygon In another embodiment the open-edged recesses on the run-in edge are arranged and designed symmetrical in regard to the longitudinal axis relative to the recesses on the run-out edge. This allows the provision of tilting pads which can be installed in a radial plain bearing regardless of the direction of rotation of the shaft that is to be supported.

This design can be realized with minimum expenditure in regard to manufacture.

The lubricant and coolant guidance-affecting structures that are arranged spaced apart from one another in axial direction on the run-in edge and/or the structures aiding the removal of lubricant and/or coolant on the run-out edge include at least three, and preferably at least four open-edged recesses.

In another embodiment this can be designed with a bearing housing having a bearing bore aligned along a bearing axis and having a number of tilting pads for supporting a shaft, said pads being movable relative to the bearing housing and being arranged circumferentially around the bearing axis at a distance from the latter, whereby the individual pad has an outer radial plain bearing surface that can be supported on a support surface on a pressure block. The individual pressure block is supported either directly on the bearing housing or, without support on the bearing housing, is moveable in a radial direction and is guided in an opening extending radially through the bearing housing and is secured against rotation in a circumferential direction of the passage opening by means of an anti-rotation element, and the end region facing away from the bearing surface is flush with the outside circumference of the bearing housing.

BRIEF DESCRIPTION OF THE DRAWINGS

The above-mentioned and other features and advantages of this invention, and the manner of attaining them, will become more apparent and the invention will be better understood by reference to the following description of an embodiments of the invention taken in conjunction with the accompanying drawings, wherein:

FIG. 1 is a perspective view of a first embodiment of a simplified basic configuration of the inventive tilting pad having structures aiding lubricant and coolant removal on the run-out edge;

FIG. 2 is a perspective view of a second embodiment of a simplified basic configuration of the inventive tilting pad having structures affecting the lubricant and coolant supply structures on the run-in edge and the run-out edge;

FIG. 3a-f illustrate possible embodiments of open-edged recesses on the run-out edge;

Corresponding reference characters indicate corresponding parts throughout the several views. The exemplifications set out herein illustrates embodiments of the invention, and such exemplifications are not to be construed as limiting the scope of the invention in any manner.

DETAILED DESCRIPTION OF THE INVENTION

Figure 3E:
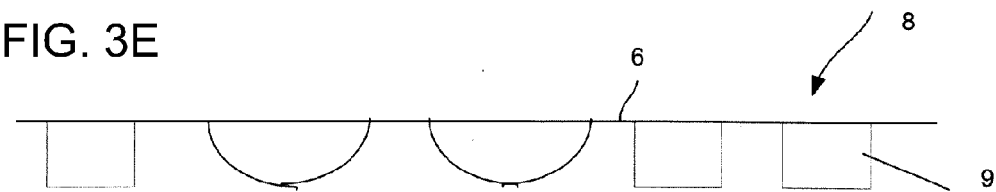

FIG. 1 is a simplified schematic illustration of a perspective view of a first embodiment of a tilting pad 1 according to the invention for supporting shafts in plain bearings, in particular in radial plain bearings. A coordinate system is applied to tilting pad 1 for the purpose of clarification of the individual directions. X-axis describes herein the axial direction in the installation position in the plain bearing and is consistent with the longitudinal direction of tilting pad 1. Y-axis describes the extension transversely to the axial direction, or respectively the longitudinal direction. Tilting pad 1 has a supporting surface 2 which, in installation position in a radial plain bearing, is consistent with the radial inside surface. Supporting surface 2 is delimited in the axial direction by lateral surfaces 3 and 4 which advantageously are arranged parallel to each other. Supporting surface 2 is delimited transversely to the axial direction by a first edge and a second edge which, in installation position are consistent respectively with a run-in edge 5 and a run-out edge 6. The terminology of "run-in edge and run-out edge" refers herein to the arrangement of tilting pad 1 relative to a shaft and its rotational direction. The edge that is reached first in direction of rotation of the shaft is described as run-in edge 5; the edge positioned after the run-in edge in the direction of rotation is described as run-out edge 6. A bearing surface 7 is provided opposite supporting surface 2 and is designed to face away from supporting surface 2. Run-in edge 5 or respectively run-out edge 6 transition either directly or via appropriate intermediate surface regions into bearing surface 7. According to the invention, structures 8 aiding the removal of lubricant and/or coolant, in particular drag oil that is guided during operation over tilting pad 1, are provided so that the run-out edge 6 has a structure deviating from straight. In the simplest case individual structures 8 that are arranged on run-out edge 6 are designed as open-edged recesses 9. Open-edged recesses 9 are arranged spaced apart from one another in the axial direction of tilting pad 1. FIG. 1 illustrates one embodiment in a uniform arrangement in the axial direction; in other words, recesses 9 are uniformly sized in regard to their geometry and distance from one another in the axial direction.

With regard to its contour, run-in edge 5 can be described as straight. In a radial plain bearing 13 (see FIG. 5), the direction of installation for tilting pads 1 is thus predetermined based on the rotational direction of the shafts that are to be supported.

FIG. 2 illustrates a second embodiment of the tilting pad 1 according to FIG. 1, here shown as tilting pad 1'. This is also structured on run-in edge 5', in other words, it includes the lubricant and coolant affecting structures 10. Advantageously, they are designed correspondingly to designs of structures 8 as open-edged recesses 11 on the run-out edge. Their function exists in improved feed of lubricant into the nip between the supporting surface 2 and the shaft that is to be supported. Nozzles (not illustrated here) are assigned for this purpose to the individual open-edge recesses 11, since they supply the recesses directly with oil.

Regarding the design of the individual open-edged recesses 9, there are a multitude of options. FIGS. 3a-f illustrate examples of possible designs for structures 8 that are assigned to run-out edge 6. Correspondingly, the designs are also applicable for the structures that are assigned to run-in edge 5'.

The details in FIGS. 3a-d show possible advantageous cross-sectional geometries for the open-edged recesses 9 on run-out edge 6. Cross-sectional geometry is hereby understood to be the cross sectional surface that is described by open-edged recess 9 when projecting into a horizontal plane that is formed with the longitudinal axis in a vertical line to same. It is understood that the following comments also apply to structures 10 on run-in edge 5' that affect the lubricant and coolant routing.

According to FIG. 3a open-edged recesses 9 or 11 have a triangular cross section. FIG. 3b shows a possible design having a polygon, in particular a rectangular cross section. FIG. 3c has a semi-circular or elliptical cross section, and FIG. 3d has a cross section expanding in one direction relative to a respective run-in or run-out edge, for example a trapezoid shape.

FIGS. 3a-d show an arrangement of uniformly open-edge recesses over the progression of the run-out edge in regard to sizing and type of cross section. It is also conceivable to combine different variations in the axial direction with each other. An example of such an embodiment is illustrated in FIG. 3e, wherein a polygon shape is combined with an elliptical shape.

Figure 3F:
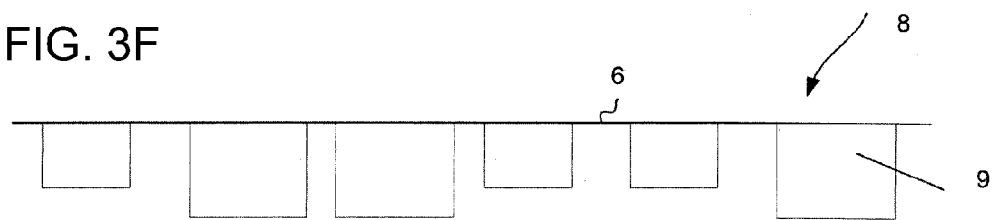

If FIGS. 3a-d illustrate designs wherein the sizing of all open-edged recesses is identical, it is moreover conceivable to also vary the sizing of individual open-edged recesses 9 or 11 over the extension of tilting pad 1 or 11 in the axial direction, in addition to a variation of the contours. An example is shown in FIG. 3f. It can be seen therein that for example in the case of polygon open-edged recesses 9 the sizing differs between open-edged recesses 9 in the edge region and the center region.

It is moreover conceivable that also the cross sectional geometry in the vertical direction can vary. Viewed in particular in a vertical direction, or in the direction between supporting surface 2 and the support surface, the tapering of open-edged recess 9 is of special advantage.

Figure 4:
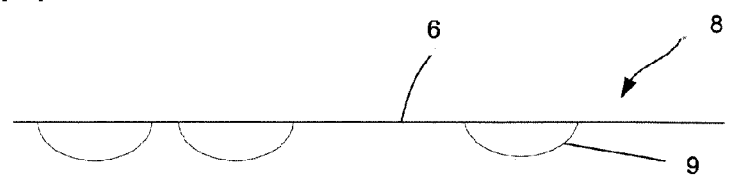
FIG. 4 illustrates a simplified schematic of a possible variation of the spaces between structures on the run-out edge.

FIG. 4 illustrates an example wherein the distances between open-edged recesses 9 can also vary in an axial direction. This applies to the combination of open-edged recesses 9 of the same type, as well as to combinations of different types, whereby a type is always characterized by a certain geometry and certain size.

The configurations of FIG. 4 are also applicable for open-edged recesses 11 on run-in edge 5'.

Figure 5:
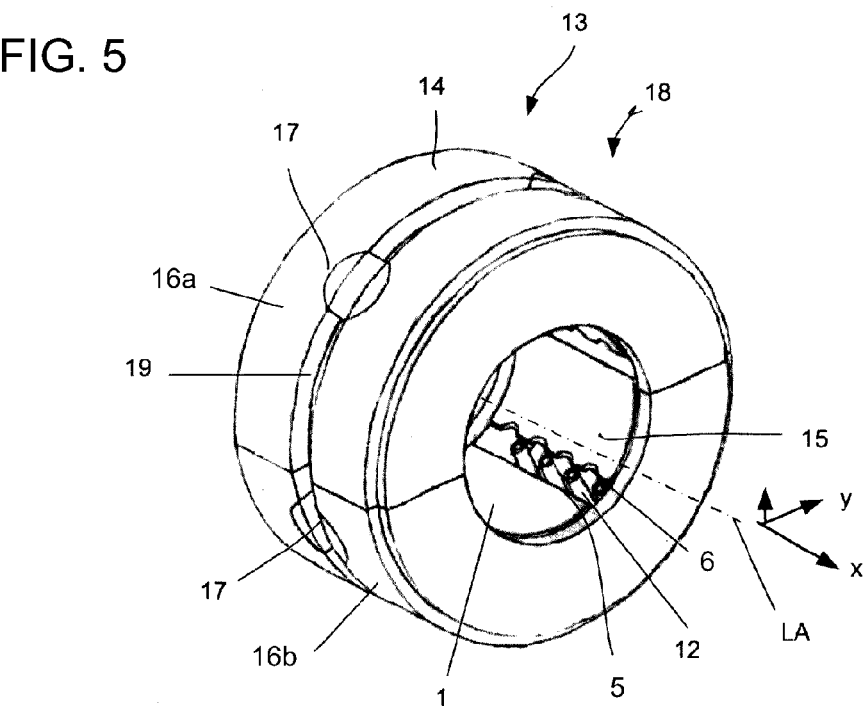
FIG. 5 illustrates an advantageous application of a tilting pad in a radial plain bearing according to the invention.

FIG. 5 illustrates the use of a tilting pad 1 according to the invention in a radial plain bearing 13. This is illustrated in a perspective view. Radial plain bearing 13 includes a bearing housing 14 having a bearing bore 15 extending along a longitudinal axis X, whereby the longitudinal axis X, is at the same time bearing axis LA describing the axial direction. Bearing housing 14 can be in the embodiment of a cylindrical sleeve. This consists preferably of at least two half shells 16a, 16b. A design consisting of several partial shells that are arranged adjacent to one another in circumferential direction around bearing axis LA and which can be connected with one another through frictional and/or positive locking is also conceivable. Radial plain bearing 13 moreover includes a number of tilting pads 1 being movable relative to bearing housing 14 and being arranged circumferentially adjacent to one another around bearing axis LA and at a distance from same. The tilting pads serve a non-illustrated shaft around its axis. In installation position, in the radial direction, originating from the bearing axis they respectively include the radial inside supporting surface 2 and a radial outside bearing surface 7, with which tilting pads 1 support themselves at least indirectly on a connecting component, in particular a support surface. The support occurs preferably in particular on a pressure block 17 which is not illustrated here, either directly on bearing housing 14 or in the bearing vicinity. Radial plain bearing 13 includes a lubricant or coolant supply system 18. In the illustrated case this includes an example of an annular groove 19 worked centrally in the axial direction into the outside circumference of the bearing housing. That, for the purpose of supplying lubricant is coupled via connecting channels that extend through the bearing housing, with a space that is created between tilting pads 1 and the inside circumference of the bearing housing. In an especially advantageous embodiment an oil supply strip 12 is provided in the region of run-in edge 5 that is conductively connected with annular groove 19 via the connecting channels. Oil supply strips 12 and the oil channels are preferably tilted relative to a radial beam. The longitudinal axis of the oil channels is therefore arranged on the circle that is limited by the shell surface of the shaft in an axis-vertical section through the bearing axis according to secant lines. Each of the oil supply strips is preferably provided with threaded bores for the screwing in of metering screws. On run-out edge 6 tilting pad 1 is designed with structures 8 according to the invention.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

COMPONENT IDENTIFICATION LIST 1 tilting pad
1' tilting pad
2 supporting surface
3 lateral surface
4 lateral surface
5 first edge, run-in edge
5' first edge, run-in edge
6 second edge, run-out edge
7 bearing surface
8 lubricant and coolant removal aiding structures
9 open-edged recesses
10 lubricant and coolant guidance affecting structures
11 open-edged recesses
12 oil supply strip
13 radial plain bearing
14 bearing housing
15 bearing bore
16a half shell
16b half shell
17 pressure block
18 lubricant and coolant supply system
19 annular groove
LA bearing axis
X,Y coordinate

The invention claimed is:
1. A tilting pad for supporting a shaft in a radial plain bearing, comprising:

a supporting surface, said supporting surface delimited in an axial direction by two lateral surfaces in a transverse direction, and in a circumferential direction by a run-in edge and a run-out edge in an installed view;

a bearing surface opposite the supporting surface; and structures aiding removal of lubricant and coolant on the run-out edge, said structures including open-edged recesses spaced apart from one another in an axial direction of the tilting pad.

2. The tilting pad of claim 1, wherein the effect of the structures aiding removal of lubricant and coolant on the run-out edge is adjustable as a function of at least one of the following factors or of a combination thereof:

the number of the structures in an axial or respectively longitudinal direction of the tilting pad;

the geometry or respective contour of the structures;

the sizing of the structures; and the positioning and alignment of the structures relative to each other in an axial or respectively longitudinal direction of the tilting pad.

3. The tilting pad of claim 1, wherein the open-edged recesses arranged on the run-out edge are designed identically in regard to at least one of or a combination of the following factors:

the geometry;

the sizing; and the distance between adjacent recesses.

4. The tilting pad of claim 1, wherein the open-edged recesses arranged on the run-out edge are designed differently in regard to at least one of or a combination of the following factors:

the geometry;

the sizing; and the distance between adjacent recesses.

5. The tilting pad of claim 1, wherein the open-edged recesses have a constant cross-sectional geometry over an extension perpendicular to the axial or respectively longitudinal direction, when viewed in a vertical direction of the tilting pad.

6. The tilting pad of claim 1, wherein the open-edged recesses have a changing cross-sectional geometry over an extension perpendicular to the axial or respectively longitudinal direction, when viewed in a vertical direction of the tilting pad.

7. The tilting pad of claim 1, wherein the geometry of the open-edged recesses can be described by an element from the group below, or a combination thereof:

a circle;

an ellipse; and a polygon.

8. The tilting pad of claim 1, further comprising structures aiding guidance of lubricant and coolant provided on the run-in edge, said structures including open-edged recesses spaced apart from one another in an axial direction of the tilting pad.

9. The tilting pad of claim 8, wherein the effect of the structures aiding guidance of lubricant and coolant at the run-in edge is adjustable as a function of at least one of the following values or of a combination thereof:

the number of the structures in an axial or respectively longitudinal direction of the tilting pad;

the geometry or respective contour of the structures;

the sizing of the structures; and the positioning and alignment of the structures relative to each other in an axial or respectively longitudinal direction of the tilting pad.

10. The tilting pad of claim 8, wherein the open-edged recesses arranged on the run-in edge are designed identically in regard to at least one of or a combination of the following factors:

the geometry;

the sizing; and the distance between adjacent recesses.

11. The tilting pad of claim 8, wherein the open-edged recesses arranged on the run-in edge are designed differently in regard to at least one of or a combination of the following factors:

the geometry;

the sizing; and the distance between adjacent recesses.

12. The tilting pad of claim 8, wherein the open-edged recesses have a constant cross-sectional geometry over an extension perpendicular to the axial or respectively longitudinal direction, when viewed in a vertical direction of the tilting pad.

13. The tilting pad of claim 8, wherein the open-edged recesses have a changing cross-sectional geometry over an extension perpendicular to the axial or respectively longitudinal direction, when viewed in a vertical direction of the tilting pad.

14. The tilting pad of claim 8, wherein the geometry of the open-edged recesses can be described by an element from the group below, or a combination thereof:

a circle;

an ellipse; and a polygon.

15. The tilting pad of claim 8, wherein the open-edged recesses on the run-in edge are arranged and designed symmetrically in regard to a longitudinal axis of the tilting pad relative to the open-edged recesses on the run-out edge.

16. The tilting pad of claim 1, wherein the structures aiding removal of lubricant and coolant at the run-out edge comprise at least three open-edged recesses.

17. The tilting pad of claim 8, wherein the structures aiding guidance of lubricant and coolant at the run-in edge comprise at least three open-edged recesses.

18. A radial plain bearing, comprising:

a bearing housing having a bearing bore aligned along a bearing axis; and at least one tilting pad for supporting a shaft, said at least one tilting pad being moveable relative to the bearing housing, arranged circumferentially around and at a distance from the bearing axis, and having an outer radial plain bearing surface that can be supported on a support surface of a pressure block provided in the bearing housing, said at least one tilting pad including:

a supporting surface, said supporting surface delimited in an axial direction by two lateral surfaces in a transverse direction, and in a circumferential direction by a run-in edge and a run-out edge in an installed view;

a bearing surface opposite the supporting surface; and structures aiding removal of lubricant and coolant on the run-out edge, said structures including open-edged recesses spaced apart from one another in an axial direction of the tilting pad;

wherein the pressure block is moveable without support on the bearing housing in a radial direction and is provided in an opening extending radially through the bearing housing, and is secured against rotation in the circumferential direction of the opening, and an end region facing away from the bearing surface is flush with the outside circumference of the bearing housing.

19. The radial plain bearing of claim 18, wherein the at least one tilting bearing further comprises structures aiding guidance of lubricant and coolant provided on the run-in edge, said structures including open-edged recesses spaced apart from one another in an axial direction of the tilting pad.

* * * * *